United States Patent
Wei

(10) Patent No.: US 10,324,303 B2
(45) Date of Patent: Jun. 18, 2019

(54) STEREOSCOPIC DISPLAY DEVICE

(71) Applicant: BOE Technology Group Co., Ltd., Beijing (CN)

(72) Inventor: Wei Wei, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/769,177

(22) PCT Filed: Dec. 17, 2014

(86) PCT No.: PCT/CN2014/094048
§ 371 (c)(1),
(2) Date: Aug. 20, 2015

(87) PCT Pub. No.: WO2016/037433
PCT Pub. Date: Mar. 17, 2016

(65) Prior Publication Data
US 2016/0252739 A1    Sep. 1, 2016

(30) Foreign Application Priority Data

Sep. 12, 2014 (CN) .......................... 2014 1 0465694

(51) Int. Cl.
*G02B 27/22* (2018.01)
*H04N 13/305* (2018.01)
(Continued)

(52) U.S. Cl.
CPC ..... *G02B 27/2214* (2013.01); *G02B 27/2242* (2013.01); *H04N 13/305* (2018.05); *H04N 13/31* (2018.05); *H04N 13/344* (2018.05)

(58) Field of Classification Search
CPC .... G02B 27/02; G02B 27/22; G02B 27/2207; G02B 27/2214; G02B 27/2221;
(Continued)

(56) References Cited

U.S. PATENT DOCUMENTS

2006/0050016 A1* 3/2006 Tomisawa .......... G02B 27/2214
345/32
2010/0165221 A1 7/2010 Krijn et al.
(Continued)

FOREIGN PATENT DOCUMENTS

CN    2556670 Y    6/2003
CN    1573421 A    2/2005
(Continued)

OTHER PUBLICATIONS

Second Chinese Office Action dated Jun. 24, 2015; Appln. No. 201410465694.6.
(Continued)

*Primary Examiner* — Jade R Chwasz
(74) *Attorney, Agent, or Firm* — Ladas & Parry LLP

(57) ABSTRACT

A stereoscopic display device is provided. The stereoscopic display device includes: a display panel, including a plurality of first display units and a plurality of second display units arranged alternately; a grating, disposed on a light exiting side of the display panel and including a plurality of light-transmitting regions and a plurality of light-shielding regions, wherein the display device includes a lens with a light convergence action at a position corresponding to each of the light-transmitting regions of the grating. In this way, while reducing a distance from the grating to the display panel, it is possible to ensure a 3D displaying effect be obtained at a longer distance.

20 Claims, 3 Drawing Sheets

(51) Int. Cl.
*H04N 13/31* (2018.01)
*H04N 13/344* (2018.01)

(58) Field of Classification Search
CPC ............ G02B 27/2228; G02B 27/2242; H04N 13/04; H04N 13/0402; H04N 13/0404; H04N 13/0409; H04N 13/0422; H04N 13/0431; H04N 13/0434; H04N 13/0436; H04N 13/0438
USPC .................. 359/462, 463, 466, 467, 477
See application file for complete search history.

(56) References Cited

U.S. PATENT DOCUMENTS

| | | | | |
|---|---|---|---|---|
| 2011/0182570 | A1* | 7/2011 | Yeh ....................... | G03B 35/22 396/326 |
| 2012/0134019 | A1* | 5/2012 | Wu ..................... | G02B 27/2214 359/463 |
| 2013/0114007 | A1* | 5/2013 | Lin ..................... | H04N 13/0409 349/15 |
| 2013/0120543 | A1 | 5/2013 | Chen et al. | |
| 2014/0118824 | A1 | 5/2014 | Hsieh et al. | |
| 2015/0153581 | A1 | 6/2015 | Wang | |
| 2015/0269893 | A1 | 9/2015 | Wu | |

FOREIGN PATENT DOCUMENTS

| | | | |
|---|---|---|---|
| CN | 101507288 | A | 8/2009 |
| CN | 202057895 | U | 11/2011 |
| CN | 102478715 | A | 5/2012 |
| CN | 102751585 | A | 10/2012 |
| CN | 102868900 | A | 1/2013 |
| CN | 102998805 | A | 3/2013 |
| CN | 103149732 | A | 6/2013 |
| CN | 103293689 | A | 9/2013 |
| CN | 203275846 | U | 11/2013 |
| CN | 103605174 | A * | 2/2014 |
| CN | 203587894 | A | 5/2014 |
| CN | 203643630 | A | 6/2014 |
| EP | 1489858 | A2 | 12/2004 |
| JP | 2011-081141 | A | 4/2011 |
| JP | 2012-168375 | A | 9/2012 |
| JP | 5552354 | B2 | 7/2014 |
| WO | 2010052304 | A1 | 5/2010 |

OTHER PUBLICATIONS

International Search Report & Written Opinion of the International Searching Authority Appln. No. PCT/CN2014/094048; dated Jun. 18, 2015.
First Chinese Office Action dated Feb. 1, 2016; Appln. No. 201410465594.6.
Third Chinese Office Action dated Sep. 28, 2016; Appln. No. 201410465694.6.

* cited by examiner

STEREOSCOPIC DISPLAY DEVICE

TECHNICAL FIELD

An embodiment of present invention relates to a stereoscopic display device.

BACKGROUND

In recent years, stereoscopic display has become a mainstream trend in a display field. The most basic principle of the stereoscopic display is that: left and right eyes of a person receive different images with parallax, then the different images are superimposed and regenerated by a brain, to form a three-dimensional stereoscopic view.

A three-dimensional display technology mainly comprises a glasses type and a naked-eye type; as no glasses need to wear, the naked-eye type three-dimensional display has attracted more and more attention. As shown in FIG. 1, an existing naked-eye stereoscopic display device, as shown in FIG. 1, comprises a display panel 100 and a grating 200, wherein, the display panel 100 includes a plurality of first display units 101 and a plurality of second display units 102, the first display units 101 display a left-eye image, and the second display units 102 display a right-eye image; the grating 200 includes light-shielding regions and light-transmitting regions, so that the grating has a light splitting function, to enable a left eye to only see the left-eye image and a right eye to only see the right-eye image, so as to generate a stereoscopic feeling.

As shown in FIG. 1, an interval e between the left eye and the right eye of the person is generally about 65 mm, a viewing distance between the left and right eyes and the grating is H, a distance between the grating and the display units is f, and a pitch of two adjacent display units is p. With reference to FIG. 1, $\triangle ABC$ and $\triangle AED$ are similar, then p:e=f:H; moreover, after the display panel is formed, the pitch p between adjacent two display units is constant, and the interval e between the two eyes of the viewer is constant, then the distance f from the grating to the display unit is proportional to the viewing distance H from the eyes to the grating, that is to say, the greater the distance f from the grating to the display unit is, the greater the viewing distance H from the eyes to the grating is. Regarding a large-scale display device, such as a television, an advertisement screen and the like, in order to obtain a 3D displaying effect at a longer distance, it is necessary to provide the spacing glass 300 between the display panel 100 and the grating 200 to increase the viewing distance H from the eyes to the grating, a thickness of the spacing glass 300 commonly is 7-8 times of a thickness of the glass substrate at a light exiting side of the display panel. Therefore, such a product is relatively thick and heavy, is not benefit for transportation and assembly. If the distance from the grating to the display unit is decreased, however, although the thickness of the display device is reduced, the viewing distance from the eyes to the grating is also correspondingly reduced, which is adverse to obtain the 3D displaying effect at a longer distance.

SUMMARY OF THE INVENTION

An embodiment of present invention provides a stereoscopic display device, which, while reducing a distance from a grating to a display panel, can ensure a 3D displaying effect be obtained at a longer distance.

On the one hand, an embodiment of present invention provides a stereoscopic display device, comprising: a display panel, comprising a plurality of first display units and a plurality of second display units arranged alternately; a grating, disposed on a light exiting side of the display panel and comprising a plurality of light-transmitting regions and a plurality of light-shielding regions, wherein the display device comprises a lens with a light convergence action at a position corresponding to each of the light-transmitting regions of the grating.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 2:
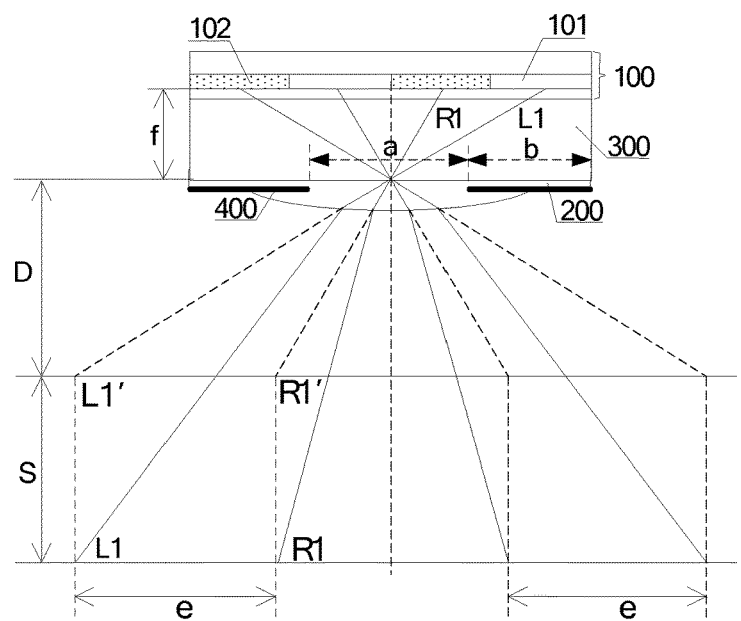
FIG. 2 is a schematic diagram of a stereoscopic display device provided by an embodiment of present invention.

An embodiment of the invention provides a stereoscopic display device, as shown in FIG. 2, comprising a display panel 100 and a grating 200 disposed on a light exiting side of the display panel 100, wherein, the display panel 100 includes a plurality of first display units 101 and a plurality of second display units 102 which are alternately arranged, the first display units 101 display a left-eye image and the second display units 102 display a right-eye image; the grating 200 includes light-transmitting regions a and light-shielding regions b; the display device comprises a lens 400 with a light convergence action at a position corresponding to the light-transmitting region a of the grating 200, and after light from the first display unit 101 and the second display unit 102 is deflected by the lens 400, the left eye receives the left eye image, and the right eye receives the right eye image. The display device comprises a lens with the light convergence action at a position corresponding to the light transmitting-region a of the grating, herein, it may be that one lens with the light convergence action is provided at a position corresponding to each of the light-transmitting regions a of the grating, or one lens corresponds to more than one light transmitting regions, after the light from the light-transmitting region is deflected when passing through the lens, the left eye receives the left eye image, and the right eye receives the right eye image. Herein the display device shown in FIG. 2 further comprises a spacing glass 300, the grating 200 is located at a light exiting side of the spacing glass 300.

Exemplarily, as shown in FIG. 2, light emitted by the first display units 101 of the display device is L1, and light emitted by the second display units 102 of the display device is R1. In a case that the display device is not added with a lens, a light path of the light L1 emitted by the first display units 101 and that of the light RI emitted by the second display units 102 are shown by dotted lines; at a position away from the grating 200 by a distance D, an interval between L1' and R1' is equal to the interval between the right and left eyes, that is to say, the left eye receives the left eye image, while the right eye receives the right eye image. The light path of the light L1 emitted by the first display units 101 and that of the light R1 emitted by the second display units 102 after being deflected by the lens 400 are shown by solid lines, at the position away from the grating 200 by a distance S+D after deflection by the lens 400, the interval between the L1 and R1 is equal to the interval between the right and left eyes, that is to say, the left eye receives the left eye image, while the right eye receives the right eye image. In this way, by providing the lens with the convergence action, a position for viewing a 3D image is longer from the grating, that is to say, the viewing distance is increased.

Figure 4:
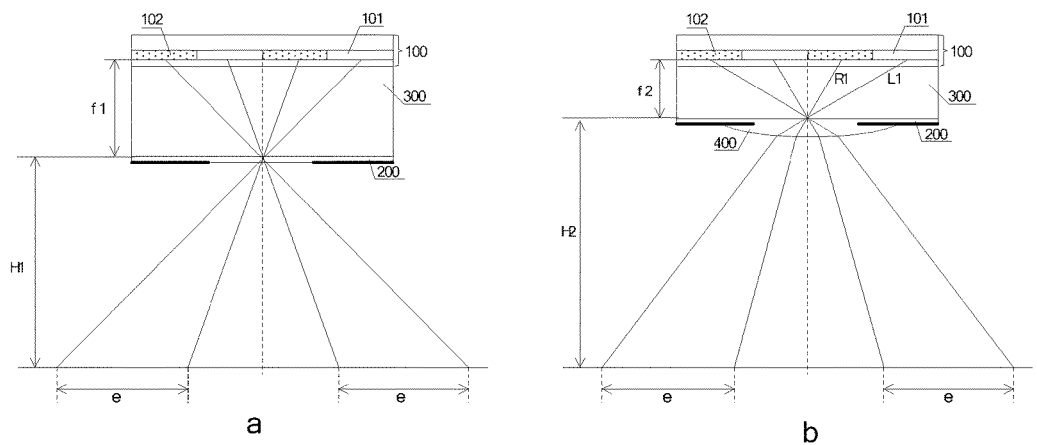
FIG. 4 is an effect comparison schematic diagram of the stereoscopic display device provided by the embodiment of the invention and the existing stereoscopic display device.

As the distance f between the grating and the display units is proportional to the viewing distance H between the left and right eyes and the grating, the greater the distance from the grating to the display unit is, the greater the viewing distance from the eyes to the grating is, then while the distance between the grating and the display units is decreased, the display device may be provided with the lens with the light convergence action in the light-transmitting regions of the grating, so that a 3D image can be viewed at a position of the original viewing distance. As shown in FIG. 4, in FIG. 4(a), the distance between the grating and the display units is f1, the viewing distance between the left and right eyes and the grating is H1, and the left-eye image displayed by the first display units 101 and the right-eye image displayed by the display units 102 are respectively received by the left eye and the right eye at a position of H1. In FIG. 4(b), the distance between the grating and the display units is f2, and f1>f2, the viewing distance between the left and right eyes and the grating is H2, and the left image displayed by the first display units 101 and the right image displayed by the second display units 102 are respectively received by the left eye and the right eye at a position of H2. Since the display device of FIG. 4(b) further comprises a lens 400 with a light convergence action, after being deflected by the lens 400, the left-eye image displayed by the first display units 101 and the right-eye image displayed by the second display units 102 are respectively received by the left eye and right eye at the position of H2, and H1+f1=H2+f2 can be achieved. That is to say, under the condition that the display device is lighter and thinner, the 3D image can be viewed at a longer distance.

Figure 1:
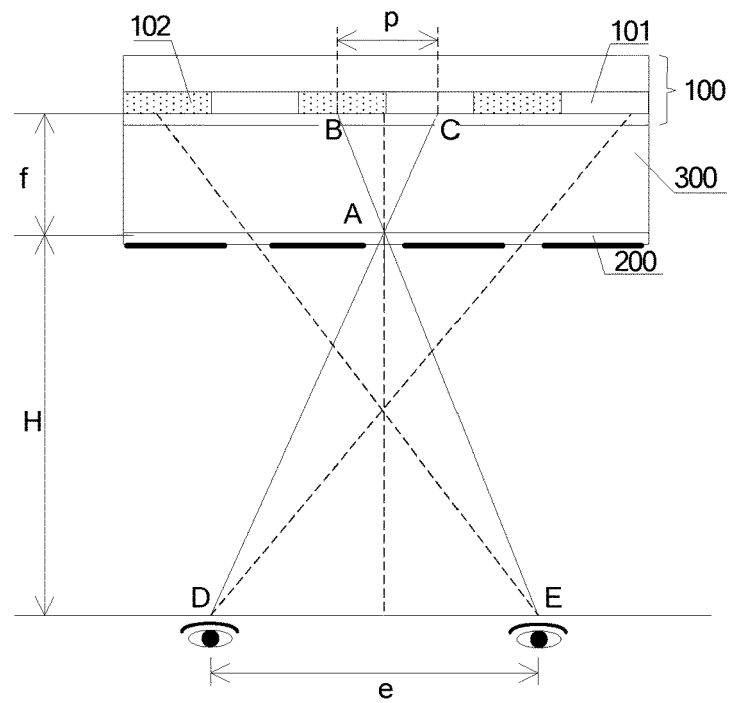
FIG. 1 is a schematic diagram of a current stereoscopic display device.
Figure 3:
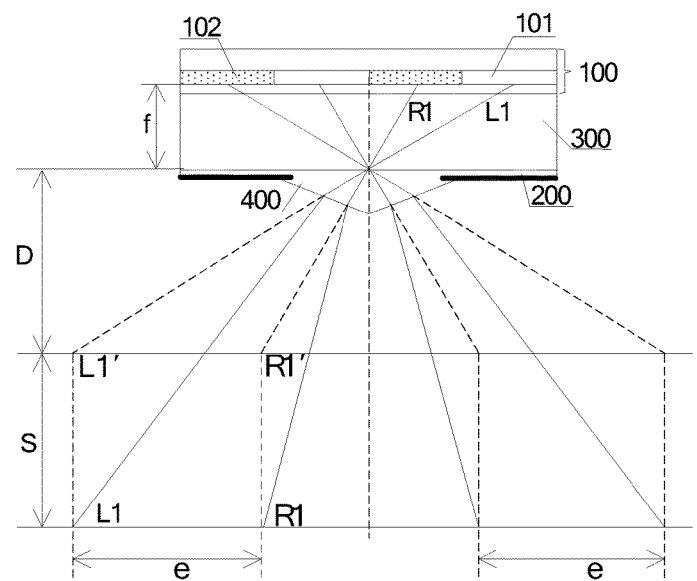
FIG. 3 is a schematic diagram of another stereoscopic display device provided by an embodiment of present invention.

It should be explained that light passing through the lens with the light convergence action can be converged. The lens with the light convergence action may be shown in FIG. 2 or FIG. 3, or may be a convex lens and other lens with the light convergence action; embodiments of the invention only take what is shown in FIG. 2 and FIG. 3 as an example for detailed description, identical principle and analysis is appli- cable for other lens with the light convergence action, and repeated description thereof is omitted herein. In addition, as shown in FIGS. 2 and 3, the display panel 100 comprises a plurality of first display units 101 and a plurality of second display units 102, and in transverse and longitudinal direc- tions of the display panel 100 (in FIG. 1, only in the transverse direction), the first display units 101 and the second display units 102 may also be arranged alternately.

A stereoscopic display device provided by an embodiment of present invention comprises a display panel, a grating and a lens with light convergence action at a position corre- sponding to each of the light-transmitting regions of the grating, and compared with a case without the lens, after light of the first display units and the second display units is refracted by the lens, the left eye receives a left-eye image and the right eye receives a right-eye image at a longer distance, and the display device can realize that the 3D image can be viewed at a longer distance by using the lens with the light convergence action under the condition of the display panel being more lighter and thinner.

Exemplarily, the display device is provided with one lens with a light convergence action at a position corresponding to each of light-transmitting region of the grating and on a light exiting side of the grating, a plurality of lenses have the same convergence effect; that is to say, each lens is in a same shape, and has a same light deflecting degree. Of course, two or more adjacent light-transmitting regions correspond to one lens, but the lens has the same light convergence effect at each of the positions corresponding to the two or more light-transmitting regions, for example, the curvature is consistent, thus ensuring the same light deflection in each of the light-transmitting regions; and in the embodiment of the invention, the case that one lens corresponds to one light- transmitting region is taken as an example for detailed description.

Figure 6:
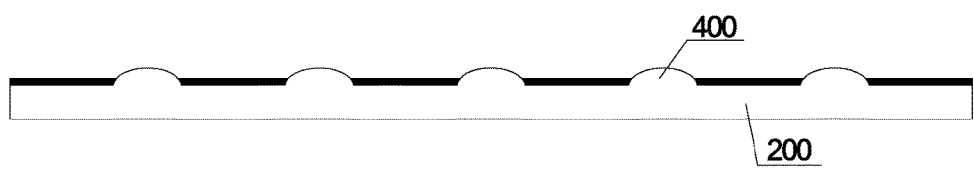
FIG. 6 is an exemplary structural diagram of a grating provided by an embodiment of present invention.

Exemplarily, as shown in FIG. 6, the lens 400 with the light convergence action is located at a light exiting side of the grating 200. Of course, the lens with the light conver- gence action may also be provided between the grating and the display panel, and when the lens is located between the grating and the display panel, transparent adhesive may be filled between the grating and the display panel to favorably fix the lens and the grating. In the embodiments and the drawings of the invention, the case that the lens with the light convergence action is disposed on a light exiting side of the grating is taken as an example for detailed description.

Alternatively, the lens with the light convergence action may be a triangular prism as shown in FIG. 3, or a plano- convex lens as shown in FIG. 2. Further, as shown in FIGS. 2 and 3, the lens 400 with the light convergence action has a flat surface on a light incident side thereof and has a convex surface on a light exiting side thereof. Wherein, the convex surface of the plano-convex lens as shown in FIG. 2 is a convex spherical surface, and the convex surface of the triangular prism as shown in FIG. 3 is an outwardly bending surface.

Figure 5:
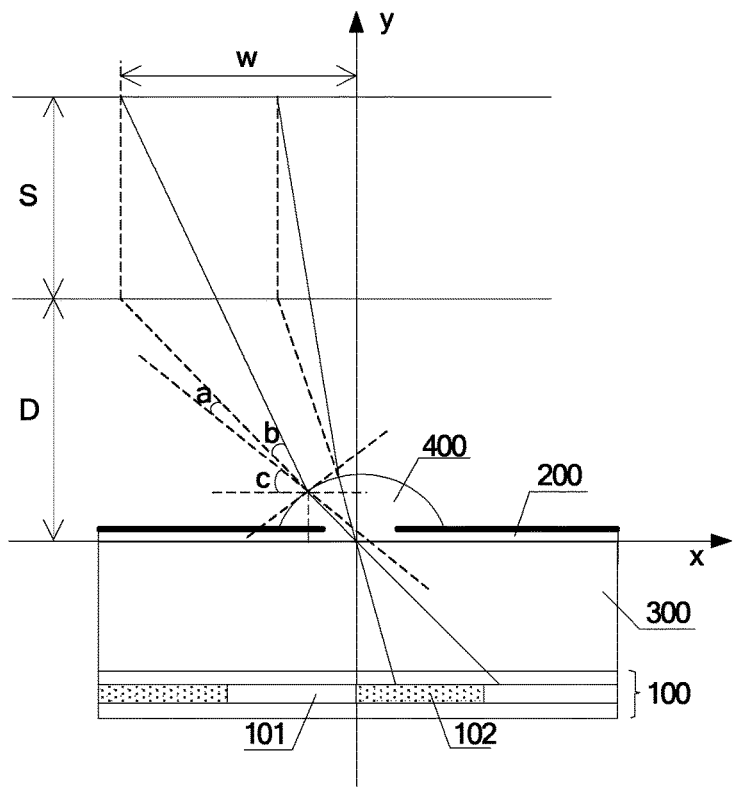
FIG. 5 is a light path analysis diagram of a stereoscopic display device provided by an embodiment of present invention.

Alternatively, as shown in FIG. 5, an optical axis of the plano-convex lens (i.e., the lens 400) passes through a center point of a light-transmitting region, by taking the center point of the light-transmitting region as a coordinate origin (0, 0), an x axis being parallel with the grating, and a y axis being perpendicular to the grating, any point (x, y) on a convex surface of the lens with the light convergence action meets conditions of:

$$n \sin a = \sin(a+b);$$

$$\tan(a+b+c) = \frac{D+S-y}{w-x};$$

$$\tan(a+c) = \frac{D-y}{w-x};$$

$$\frac{(D+S-y)\sin(a+c)}{(D-y)\sin(a+b+c)} = \frac{\sin(90°-a-c)}{\sin(90°-a-b-c)};$$

Wherein, x is an x coordinate corresponding to any point on the convex surface, y is a y coordinate corresponding to any point on the convex surface, n is a refractive index of the lens, a is an incident angle, b is a difference between an incident angle and a refractive angle, c is an included angle between a normal of any point on the convex surface and x axis at a refracted light side, w is a maximal distance between the left and right eyes and the optical axis of the plano-convex lens when the left and right eyes are located on one side of the optical axis of the convex lens, S+D is a distance between a design position and the grating, D is a distance between a first position and the grating, wherein, the first position is the design position of the display panel without the lens. The design position is an optimal position for obtaining a 3D image. In addition, in the embodiments of the invention, the case that the 3D image is obtained at the optimal position is taken as an example.

When the lens meets the above conditions, as shown in FIG. 2, light emitted by the first display units 101 of the display device is L1 and light emitted by the second display units 102 of the display device is R1. In a case that the display device is not added with the lens, the light L1 emitted by the first display units 101 and the light R1 emitted by the second display units 102 are L1' and R1' at a position away from the grating by a distance of D, wherein, a distance between L1' and R1' is the interval e between the left and right eyes (about 65 mm), so the left eye of an observer receives a left-eye image, and the right eye receives a right-eye image. The light path of the light L1 emitted by the first display units 101 and that of the light R1 emitted by the second display units 102 after being deflected by the lens 400 are shown by solid lines, as shown in FIG. 2, after deflection by the lens 400, at a position away from the grating by a distance S+D, light emitted by left-eye pixels and light emitted by right-eye pixels are L1 and R1, wherein the distance between L1 and R1 is the interval e of the left and right eyes (about 65 mm), so the left eye of the observer receives the left-eye image, and the right eye receives the right-eye image. That is to say, a 3D image can be viewed at a longer distance under the condition of the display panel being more lighter and thinner.

It should be explained that the embodiments and drawings of the invention take one lens as example, and the lenses corresponding to the light-transmitting regions of the grating may refer to a design principle of the above lens.

Alternatively, as shown in FIGS. 2 and 3, the display device may further comprise a transparent spacing substrate 300 between the grating 200 and the display panel 100. When the display device further comprises a transparent spacing substrate located between the grating and the display panel, by decreasing a thickness of the spacing glass, it is possible to make the display device even more light and thin, and at the same time, it is also possible to improve mechanical performance, such as compression resistant, of the display device with such a transparent spacing glass.

Exemplarily, as shown in FIG. 6, a width of the lens 400 with the light convergence action may equal to a width of each of the light-transmitting regions. The embodiments of the invention take what is shown in the diagram as an example.

Exemplarily, as shown in FIG. 6, the grating and the lenses with the light convergence action are of an integral structure. The integral structure means that the grating and the lenses with the light convergence action are of a whole structure. The lenses with the light convergence action may be formed in a manufacturing process of the grating; or the lenses with the light convergence action may also be formed on the grating after the grating is formed.

Of course, in embodiments of the invention, the grating and the lenses with the light convergence action may be not of an integral structure. For example, the lenses may be adhered to a surface of the grating by adhesive and the like, which is not limited by the embodiments of the invention.

Exemplarily, the grating and the lenses with the light convergence action may be formed by one patterning process.

For example, after the grating is formed, transparent photoresist is coated on a surface of the grating, and the transparent photoresist is formed to have a surface appearance of the lenses with the light convergence action by one exposure, developing and etching.

Exemplarily, the grating and the lenses with the light convergence action may be formed by a photolithograph process and for forming the grating and the lenses with the light convergence action by the photolithograph process, the photoresist may be formed on a glass substrate, a photoresist reserving region and a photoresist removing region are formed by one exposure and developing, a plasma dry etching is performed in the photoresist reserving region, convex lenses or triangular prisms are formed on a surface of the glass substrate, then black mylars are adhered to the photoresist removing region to make it to be light shielding, so as to form a grating with the light convergence action.

For the integral structure of the grating and the lenses with the light convergence action formed by such manner, the grating and the lenses with the light convergence action are made of a same material at the same time, and are good in stability compared with those made of different materials, and the grating and the lenses are not easy to be separated.

A stereoscopic display device provided by the embodiments of present invention comprises a display panel, a grating and a lens with the light convergence action disposed at a position corresponding to a light-transmitting region of the grating, and compared with a case without the lens, the left eye receives a left-eye image and the right eye receives a right-eye image at a farther position, and the display device can realize that the 3D image can be viewed at a longer distance by the lens with the light convergence action under the condition of the display panel being lighter and thinner. The above only are exemplary embodiments of the invention, and not intended to define the scope of the invention; modification or substitution which is easily thought by any person skilled in the art within the technical scope disclosed by the invention should fall into the protection scope of the invention. Therefore, the protection scope of the invention should be the protection scope of the claims.

The present application claims the priority of the Chinese patent application No. 201410465694.6 filed on Sep. 12, 2014, the entirety of which is incorporated herein by reference as a part of the present application.

What is claimed is:

1. A stereoscopic display device, comprising:
a display panel, comprising a plurality of first display units and a plurality of second display units arranged alternately;
a grating, disposed on a light exiting side of the display panel and comprising a plurality of light-transmitting regions and a plurality of light-shielding regions, wherein
the display device comprises a lens with a light convergence action at a position corresponding to each of the light-transmitting of the grating, a width of the lens with the light convergence action is equal to a spacing between two adjacent light-shielding regions of the grating;
two adjacent lenses are separated by corresponding light shielding region, which is provided between the two adjacent lenses, of the grating; a size of each of the light-shielding regions, along a direction in which the plurality of first display units and the plurality of second display units being arranged alternately, is larger than a size of a corresponding lens along the direction in which the plurality of first display units and the plurality of second display units being arranged alternately; and
the grating is configured to allow light emitted by the first display units and light emitted by the second display units to be respectively emmited toward and received by a left eye and a right eye of a user, and the lens with the light convergence action is configured to converge light transmitted through the grating, so as to increase a viewing distance of the stereoscopic display device.

2. The stereoscopic display device according to claim 1, wherein the lens is a triangular prism or a plano-convex lens.

3. The stereoscopic display device according to claim 2, wherein a light incident side of the triangular prism or plano-convex lens is a flat surface and a light exiting side of the triangular prism or plano-convex lens is a convex surface.

4. The stereoscopic display device according to claim 3, wherein an optical axis of the plano-convex lens passes through a center point of the corresponding light-transmitting region, by taking the center point of the light-transmitting region as a coordinate origin (0, 0), an x axis being parallel with the grating, and a y axis being perpendicular to the grating, any point (x, y) on the convex surface of the plano-convex lens meets conditions of:

$$n \sin a = \sin(a+b);$$

$$\tan(a+b+c) = \frac{D+S-y}{w-x};$$

$$\tan(a+c) = \frac{D-y}{w-x};$$

$$\frac{(D+S-y)\sin(a+c)}{(D-y)\sin(a+b+c)} = \frac{\sin(90° - a - c)}{\sin(90° - a - b - c)};$$

wherein, x is an x coordinate of the point, y is a y coordinate of the point, n is a refractive index of the lens, a is an incident angle, b is a difference between an incident angle and a refractive angle, c is an included angle between a normal line of the point and the x axis on a refracted light side, w is a maximal distance between left and right eyes and the optical axis of the plano-convex lens when the left and right eyes are located on one side of the optical axis of the plano-convex lens, S+D is a distance between a design position and the grating, D is a distance between a first position and the grating, wherein, the first position is the design position of the display panel without the lens.

5. The stereoscopic display device according to claim 4, wherein the display device comprises one lens with a light convergence action at a position corresponding to each of the light-transmitting regions of the grating, respectively.

6. The stereoscopic display device according to claim 3, wherein the display device comprises one lens with a light convergence action at a position corresponding to each of the light-transmitting regions of the grating, respectively.

7. The stereoscopic display device according to claim 3, wherein the lens with the light convergence action is located on a light exiting side of the grating.

8. The stereoscopic display device according to claim 2, wherein the display device comprises one lens with a light convergence action at a position corresponding to each of the light-transmitting regions of the grating, respectively.

9. The stereoscopic display device according to claim 2, wherein the lens with the light convergence action is located on a light exiting side of the grating.

10. The stereoscopic display device according to claim 1, wherein the display device comprises one lens with a light convergence action at a position corresponding to each of the light-transmitting regions of the grating, respectively.

11. The stereoscopic display device according to claim 1, wherein the lens with the light convergence action is located on a light exiting side of the grating.

12. The stereoscopic display device according to claim 1, wherein the display device further comprises a transparent spacing substrate arranged between the grating and the display panel.

13. The stereoscopic display device according to claim 1, wherein the grating and the lens with the light convergence action are of an integral structure.

14. The stereoscopic display device according to darn 13, wherein the grating and the lens are formed are formed by one patterning process.

15. The stereoscopic display device according to claim 14, wherein the grating and the lens with the light convergence action are made of a same material.

16. The stereoscopic display device according to claim 1, wherein the lens is located between the grating and the display panel.

17. The stereoscopic display device according to claim 1, wherein
an orthographic projection of the lens with the light convergence action on the display panel is partially overlapped with adjacent first display unit and is partially overlapped with adjacent second display unit along the direction in which the plurality of first display units and the plurality of second display units being arranged alternately.

18. The stereoscopic display device according to claim 1, further comprising a transparent spacing substrate arranged between the grating and the display panel, wherein
a thickness of the transparent spacing substrate, which is in direct contact with both of the lenses and the light-shielding regions is larger than a thickness of the lenses with the light convergence action along a direction perpendicular to the display panel.

19. A stereoscopic display device, comprising:
a display panel, comprising a plurality of first display units and a plurality of second display units arranged alternately;
a grating, disposed on a light exiting side of the display pan& and comprising a plurality of light-transmitting regions and a plurality of light-shielding regions; and
a transparent spacing substrate arranged between the grating and the display panel,
wherein
the display device comprises a lens with a light convergence action at a position corresponding to each of the light-transmitting regions of the grating, and the lens with the light convergence action is a triangular prism;
a light incident side of the triangular prism is a flat surface and a light exiting side of the triangular prism is a convex surface;
the triangular prism is in direct contact with the light-shielding regions of the grating; a thickness of the transparent spacing substrate, which is in direct contact with both the lens and the light-shielding regions is larger than a thickness of the triangular prism along a direction perpendicular to the display panel; and
each of the light-shielding regions completely covers at least one of the first display units and the second display units along a direction in which the plurality of first display units and the plurality of second display units being arranged alternately.

20. A stereoscopic display device based on a grating, comprising:
a display panel, comprising a plurality of first display units and a plurality of second display units arranged alternately;
the grating, disposed on a light exiting side of the display panel and comprising a plurality of light-transmitting regions and a plurality of light-shielding regions;
a plurality of lenses having a same shape and having a same light convergence effect;
each of the lenses is disposed at a side, which is away from the display panel, of the grating, and is corresponding to a corresponding light-transmitting region;
the grating is configured to allow light emitted by the first display units and light emitted by the second display units to be respectively emitted toward and received by a left eye and a right eye of a user;
the plurality of lenses are configured to converge light transmitted through the grating, so as to increase a viewing distance of the stereoscopic display device; and
a size of each of the light-shielding regions, along a direction in which the plurality of first display units and the plurality of second display units being arranged alternately, is larger than a size of a corresponding lens along the direction in which the plurality of first display units and the plurality of second display units being arranged alternately.

* * * * *